June 29, 1965 F. ZODER ETAL 3,192,309

INSULATION FOR WINDING WIRE AND METHOD
OF AND DEVICE FOR PRODUCING THE SAME

Filed Nov. 5, 1959

Inventors
Fritz Zoder
Hans Kallas
By Stevens Davis Miller & Mosher
Attorneys

United States Patent Office 3,192,309

Patented June 29, 1965

3,192,309

INSULATION FOR WINDING WIRE AND METHOD OF AND DEVICE FOR PRODUCING THE SAME

Fritz Zoder, House No. 45½, Ruhstorf (Rott), Germany, and Hans Kallas, Angererweg 1a, Burghausen, Upper Bavaria, Germany Filed Nov. 5, 1959, Ser. No. 851,145
Claims priority, application Germany, Nov. 8, 1958, L 31,675; Apr. 13, 1959, L 32,965
6 Claims. (Cl. 174—121)

Where electrical conductors which are subject to particularly high thermal stresses are to be provided with insulation, wires of circular or square or rectangular cross-section are provided with single or multiple coverings made of folded glass fibre yarn or of woven glass fabric ribbons. The bonding of the glass fibre yarn or woven ribbon to the surface of the conductor to be covered or the mutual bonding of adjacent layers is effected by means of an insulating resin having an organic or a silicon-organic base and affording particularly good adhesive and drying properties. For the purpose of increasing the mecahnical as well as electric strength the surface of the covered conductor is impregnated once or a plurality of times with an insulating resin having an organic or silicon-organic base. This surface impregnation has the function of increasing the dielectric strength of the insulating material on the conductor, of giving the surface of the insulating layer a maximum of smoothness and gripping capacity, and of ensuring a sufficient mechanical strength so that the covered wire will withstand the stresses imposed thereon during further fabrication thereof. By providing a high degree of surface smoothness it is possible to ensure a considerable increase in the wear resistance of the insulating layer, the said wear or abrasion resistance being primarily a function of the degree to which the covering or braiding material adheres to the surface of the conductor. Another requirement made of the wire insulating material is that it should have sufficient elasticity so that the formation of fissures and cracks during deformation of the windings or coils or parts thereof is avoided. The attainment, to an optimum extent, of the aforesaid desired characteristics is limited by the amount of insulating material used, which amount bears a certain relation to the cross-sectional area of the bare wire, another contributing factor being the physical properties of the glass fibres products and the binding agents.

It is one of the objects of the present invention to provide for considerable improvements in the aforementioned mechanical and electrical properties of the wire insulation, while reducing the amount of insulating material required, by providing a unique composition of the wire covering and by chemically matching the necessary binding agents. In the case of the insulating of winding wires for electric machinery, which wires are covered with glass fibre material and impregnated with an insulating resin having an organic or silicon-organic base, the problem stated above is solved according to the invention by providing the wire to be coated with a simple glass fibre covering which is applied in a per se known manner, by providing thermo-plasticity in the impregnating layer by giving the insulating resin combinations used as impregnating materials a particular chemical make-up, for example by the proivsion of a proportion of at least approximately 20 percent of a methyl or methyl-phenyl-silicone resin solution, by providing for a thin impregnated layer and by additionally providing a foil or film material having an iso-phthalic or terephthalic acid polyester base, the thickness of the said film amounting only to approximately 10 to 20 microns. The use of an insulating covering built up according to the invention results in the expenditure of considerably smaller quantities of insulating material and also in closer tolerances on the quantity or thickness, respectively, of the said material as compared to prior art glass fibre covered and impregnated wires of the type described earlier. The selected chemical make-up of the impregnated layer results in an extremely intimate bond between the said layer as well as the adhesive and the film. This intimate bond will not only be maintained during the addition of heat or during the baking-in of the impregnating varnish or during the operation of the machines, but it will even be increased by the action of the added silicone resin solution. By virtue of the thermo-plasticity of the impregnated layer it is not necessary to apply a very thick layer of varnish, this being in contrast to prior art glass fibre covered wires in which the varnish is intended to produce a surface that is as smooth and hard as possible. According to the invention, the required surface smoothness and wear resistance are obtained by means of the covering film and the bond between this film and the glass fibre covering.

To give an example of an embodiment of the chemical composition of the impregnated layer and of the adhesive used it may be said that the adhesive should contain at least a proportion of 20 percent of a methyl or methyl-phenyl-silicone resin solution. The proportion as well as the composition of this addition is independent of the composition of the adhesive as long as the latter consists of a purely organic, a silicone combination or a pure silicone resin.

Even such electric conductors which in operation are subject to particularly rugged thermal conditions require only a single glass fibre covering. In view of the excellent mechanical properties of the covering film made of a material having an isophthalic or terephthalic polyester base, the thickness of the film need only be 10 microns to a maximum of 20 microns. Together with inorganic insulating material carriers and sufficiently heat resistant binders such as silicone resins, the said film may be used with operating temperatures which greatly exceed the continuous temperature resistance value of the film material alone as specified by the manufacturers thereof. The shrinkage occurring at temperatures above 150° C. even tends to improve the bond between the film and the impregnated layer and thus to reduce the bulk of the insulating material. Furthermore, the caking resistance of the impregnated winding or coils is increased considerably by giving the glass fibre covered conductors a covering consisting of the said film.

The film covering may be provided either in the form of narrow ribbons having a width between 3 and 5 mm. (⅛" and 13/64") with adjacent turns partially overlapping one another, or by using the well-known longitudinal covering method. This has no effect as regards the improvement in the mechanical and electrical properties of the insulation of the conductor.

In one specific embodiment of the invention a winding wire intended for an electric generator has a bare conductor diameter of 1.4 mm. (.055"). Together with the insulation of the present invention, this conductor, given satisfactory insulating properties, has a maximum overall diameter of 1.54 mm. (.061").

Additional objects of the invention include the provision of a method of manufacturing an insulating covering as contemplated by the invention and the provision of a device adapted to carry the said method into effect. The method of the invention is characterized by the fact that the wire to be covered travels continuously between a supply reel and a take-up reel and therebetween passes through a vessel containing an adhesive, a spinning can containing folded glass fibre threads, another vessel containing the impregnating and adhesive agent, and finally a further spinning can serving to apply the film material. According to another feature of the invention the heat treatment of the impregnating and bonding agent is effected after the insertion and before the winding is impregnated, i.e. during the preliminary drying thereof. Where an impregnating and bonding agent having an adhesive resin base is used, the reticulation is effected at normal room temperature by the addition of reticulating agents.

Where glass fibre covered wires are to be insulated by the use of prior art methods, two different, separate operations have to be carired out. According to such known methods, the wire which is either bare or has been given a preliminary varnish coating is run through a vessel containing an adhesive, the excessive amount of the adhesive adhering to the wire being doctored off before the covering is applied. Following this, the wire is covered with the folded glass fibre thread. The two operations are carried out in horizontal or vertical covering machines. The number of layers provided in the covering depends on both the cross-sectional area and the cross-sectional shape of the wire. In a second operation, the wires thus covered are impregnated with an insulating resin or varnish and then subjected to a baking-in process. The application of the impregnating varnish and the baking in thereof is effected in horizontal or vertical varnishing machines succeeded by continuous ovens. In view of the mechanical properties of the glass fibres, the insulating resins having an organic or silicone-base as used heretofore have to be applied in several steps and to baked in repeatedly in order to produce the surface smoothness and hardness required for the further fabrication of the wires. In contrast to cotton covered wires, non-impregnated glass fibre covered wires cannot be used in the windings of electric machines, since their resistance to scoring and wear is insufficient. From the description of the said heretofore known method it will be understood that it is impossible to produce the entire insulation of glass fibre covered wires in a single continuous process, because the operation of applying the covering is definitely separated from the operation of applying the impregnating material. In contrast to this prior art technique, the novel method of the present invention affords the advantage that the entire insulation of the wire including the glass fibre covering can be produced continuously by a single operation, this resulting in consderable savings in labor and costs.

The device provided by the invention for carrying into effect the method of the invention is characterized by the fact that a wire covering or braiding machine of standard design is provided, in the path of the wire between the supply reel and the take-up reel, with a vessel for the impregnating and adhesive or bonding agent, which vessel is followed by a spinning dish for the covering film. In an exemplary embodiment of the invention the vessel for the impregnating and bonding agent comprises a tubular portion of greater length and smaller diameter and a drum-like shorter portion of larger diameter, and the free end of said tubular portion is provided with a seal made of a rubber-like material, while a scraper or doctor is disposed at the exit of the drum-like portion. The aperture permitting the supply of the impregnating and bonding agent to be replenished according to requirements is conveniently provided in the said drum-like portion. Thus, the method of the invention may be carried out using standard-type vertical or horizontal wire covering machines and requires only minor modifications to be incorporated in these machines. The particular shape of the vessel for the impregnating and bonding agent affords another advantage in that the drum-like portion holds a relatively large supply of the impregnating and bonding agent so as to obviate the need for frequent replenishment of the vessel. Still another advantage is afforded by the tubular portion of smaller diameter which ensures that changes in the viscosity of the impregnating and bonding agent due to the evaporation of the solvents are largely eliminated so that the application of an excessively thick layer to the wire is avoided. The provision of the filler aperture in the drum-shaped portion of the vessel also affords an advantage in that the supply of the impregnating and bonding agent can be easily replenished while the machine is in operation.

Other objects and features of the invention will become apparent as the description proceeds, especially when taken in conjunction with the accompanying drawing, illustrating a preferred embodiment of the invention, wherein.

Figure 1:
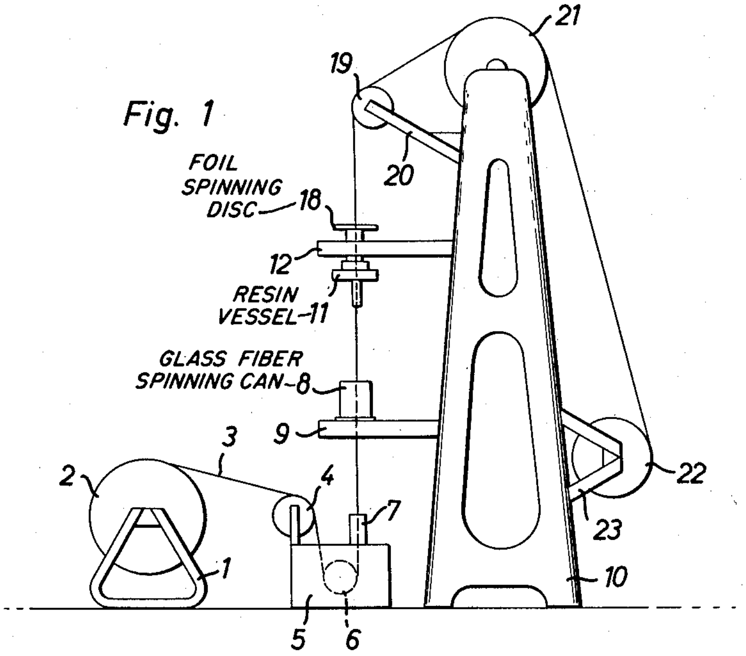
FIG. 1 is a side elevational view of a vertical wire covering machine of the invention.
Figure 3:
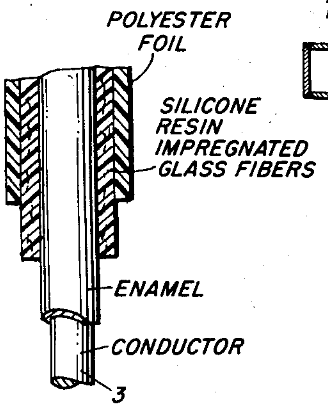
FIG. 3 is a cross-sectional view of an insulated conductor in accordance with the present invention.

As shown in FIG. 1, a supply reel 2 holding a supply of annealed predrawn wire is rotatably supported by a trestle 1. The wire 3 is passed over a guide pulley 4 disposed above a vessel 5 filled with an adhesive and is then immersed into the adhesive during its passage over another guide pulley 6 after which the wire is led through a doctor or scraper 7 during its emergence from the vessel 5. The doctor or scraper 7 provided on the upper portion of the vessel 5 serves to remove any excess adhesive from the wire so that the application of the proper amount of adhesive is ensured. It is necessary to match the properties, particularly its thermal resistance, of the adhesive with its contemplated use as an insulating material that has to meet specific requirements, and the adhesive should be capable of drying as rapidly as possible. Another requirement is that the adhesive should be compatible with the materials constituting the covering subsequently applied to the wire. The wire thus provided with a coating of adhesive is then passed through the spinning can 8 serving to add the glass fibre material, the spinning can being attached to the wire covering machine 10 through a bracket 9. The adhesive will effect a bond between the glass fibre covering material and the surface of the wire. After the glass fibre covering has been applied, the wire passes through another vessel 11 containing an impregnating and adhesive or bonding agent. This vessel is also attached to the covering machine by means of a bracket 12.

Figure 2:
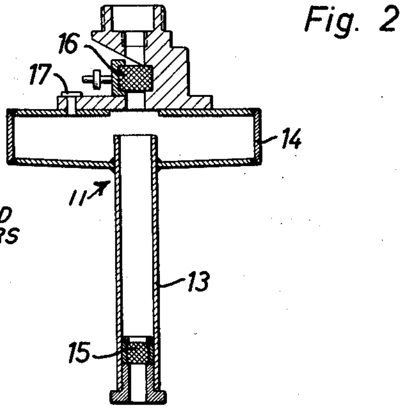
FIG. 2 is an axial cross-sectional view of the vessel for the impregnating and bonding agent.

Details of the construction of the vessel 11 containing the impregnating and bonding agent for the film covering to be applied subsequently are shown in FIG. 2. It will be seen that this vessel comprises a tubular section 13 of greater length and smaller diameter, and a shorter drum-shaped section 14 having a larger diameter. Provided within the free end of the said tubular section 13 is a seal 15 made of a rubber-like material through which the wire may pass into the vessel. The wall of the said tubular portion 13 extends upwardly beyond the bottom wall of the drum-shaped section 14. Provided at the exit of the drum-shaped portion 14 is a doctor or scraper 16 ensuring the application of the proper amount of the impregnating and bonding agent and the removal of any excess quantity adhering to the half-finished wire. The drum-shaped portion 14 is provided with a filler opening 17 permitting the supply of material in this portion to be replenished.

Thus, the wire covered with glass fibre material passes through a seal 15 consisting of a rubber-like material, is pulled through the impregnating and bonding agent contained in the tubular portion 13 of the vessel having the smaller diameter, and is removed from the vessel 13 by way of the doctor or scraper 16. After emerging from the scraper, the wire is conveyed to a spinning disc 18 carrying the film or foil material to be applied according to the invention. The wire is passed through the center of the spinning disc and is covered with the film or foil material while passing therethrough.

The speeds of the spinning can 8 applying the glass fibre material and of the spinning disc 18 applying the film or foil must be matched in such a manner that the surface of the wire is completely covered with the glass fibre material and that a slight overlapping is ensured in the outer covering consisting of the film or foil material. Moreover, the pull with which the foil or film is applied to the impregnated layer, i.e. the surface of the glass fibre material, must be properly selected in view of the composition of the impregnating and bonding agent. This has already been taken into consideration in the insulation of the invention. No additional drying means capable of being heated are provided between the various units of the wire covering machine. The necessary thermal treatment is not effected before the coil has been wound and before the coil is inserted in position, i.e. during the pre-drying stage. Thus, the heat treatment of the impregnating and bonding agent is combined with the drying operation as a single step, it being necessary under all circumstances, where motors are concerned, to perform a drying operation after the positioning of the coils or windings and before the drying thereof.

From the spinning disc 18, the finished insulated wire is passed over a guide pulley 19 carried by an arm 20 of the wire covering machine 10 and over another guide pulley 21 at the top of the machine to a take-up reel or drum 22 which is supported for rotation by a bracket connected with the frame of the machine.

In all insulating compositions of the invention, the composition of the adhesive and of the impregnating agent is selected in such a manner that the insulated wires may be stored indefinitely without the bond between the foil or film material and the surface of the glass fibre covering being impaired. While a vertical wire covering machine has been described as an embodiment of the invention, it will be understood that it is also possible to modify a horizontal machine according to the invention and to use it in carrying into effect the method of the invention.

What is claimed is:

1. An insulated electrical conductor comprising an electrical conductor, a thin layer of glass fibers wrapped about said conductor, said layer being impregnated with a thermoplastic insulating resin composition comprising at least 20 percent of a silicone resin selected from the group consisting of methyl-silicone resin and methyl-phenyl-silicone resin, and an outer layer of foil wrapped about said impregnated layer and bonded thereto, said foil being a resin selected from the class consisting of terephthalic polyester and isoterephthalic polyester.

2. An electrical conductor as set forth in claim 1 in which a layer of insulating varnish is interposed between the conductor and the layer of glass fibers.

3. An electrical conductor as set forth in claim 1 in which the glass fibers are in the form of threads.

4. An electrical conductor as set forth in claim 1 in which the outer layer of foil has a thickness of about 10 to 20 microns.

5. The method of manufacturing an insulated electrical conductor which comprises the steps of passing a bare conductor wire through an insulating varnish, spinning a thin layer of glass fiber about said conductor while wetted with said varnish, passing the resulting glass fiber coated wire through a bath of liquid thermoplastic insulating resin composition containing at least 20 percent of a component selected from the group consisting of methyl-silicone resin and methyl-phenyl silicone resin to impregnate the glass fiber coating, removing excess composition from the thus treated conductor, and wrapping the said treated conductor with a layer of resin foil remaining on said conductor and forming part of the insulation of said conductor, said resin being a member of the class consisting of terephthalic polyester and isoterephthalic polyester.

6. The method according to claim 5 in which the insulation is cured after winding into the desired form.

References Cited by the Examiner

UNITED STATES PATENTS

| | | | |
|---|---|---|---|
| 1,943,818 | 1/34 | Fantone et al. | 118—125 |
| 1,955,908 | 4/34 | Fantone et al. | 57—7 |
| 2,238,575 | 4/41 | Alexay | 118—125 |
| 2,504,845 | 4/50 | Keyes | 154—2.28 |
| 2,595,729 | 5/52 | Swiss et al. | |
| 2,601,336 | 6/52 | Smith-Johannsen. | |
| 2,836,744 | 5/58 | Clawson | 154—2.27 |
| 2,993,820 | 7/61 | Marshall | 154—2.27 |

EARL M. BERGERT, *Primary Examiner.*

CARL F. KRAFFT, *Examiner.*